US012106318B1

United States Patent
Chiang et al.

(10) Patent No.: US 12,106,318 B1
(45) Date of Patent: Oct. 1, 2024

(54) PROMPT MANAGEMENT SYSTEMS FOR MODERATING GENERATIVE ARTIFICIAL INTELLIGENCE OPERATIONS

(71) Applicant: Wevo, Inc., Boston, MA (US)

(72) Inventors: Frank Chiang, Boston, MA (US); Dustin Garvey, Exeter, NH (US); Alexander Barza, Cambridge, MA (US); Alexa Stewart, Andover, MA (US); Charlie Hoang, Boston, MA (US); Jon Andrews, Boston, MA (US); Hannah Sieber, Mendon, MA (US); Jessica Yau, Boston, MA (US); Shachar Koresh, Boston, MA (US); Janet Muto, Boston, MA (US); Nitzan Shaer, Boston, MA (US)

(73) Assignee: Wevo, Inc., Boston, MA (US)

( * ) Notice: Subject to any disclaimer, the term of this patent is extended or adjusted under 35 U.S.C. 154(b) by 0 days.

(21) Appl. No.: 18/457,178

(22) Filed: Aug. 28, 2023

Related U.S. Application Data

(60) Provisional application No. 63/497,029, filed on Apr. 19, 2023.

(51) Int. Cl.
G06Q 30/0204 (2023.01)
G06Q 10/0631 (2023.01)

(52) U.S. Cl.
CPC . *G06Q 30/0204* (2013.01); *G06Q 10/063112* (2013.01)

(58) Field of Classification Search
CPC .................. G06Q 30/0204; G06Q 10/063112
See application file for complete search history.

(56) References Cited

U.S. PATENT DOCUMENTS

| | | | | |
|---|---|---|---|---|
| 7,249,117 | B2 * | 7/2007 | Estes | G06N 5/022 706/18 |
| 9,275,641 | B1 * | 3/2016 | Gelfenbeyn | G10L 15/26 |
| 10,629,191 | B1 * | 4/2020 | Cheng | G06F 40/205 |
| 11,475,218 | B2 * | 10/2022 | Lee | G06F 3/0482 |
| 2019/0354874 | A1 * | 11/2019 | Shah | G06N 5/022 |
| 2022/0100961 | A1 * | 3/2022 | Vishnoi | G06F 16/35 |

* cited by examiner

*Primary Examiner* — Nadja N Chong Cruz

(74) *Attorney, Agent, or Firm* — Invoke

(57) ABSTRACT

Operations of a prompt management system are disclosed. The operations may include: receiving a prompt for performing a set of tasks, assigning an agent group that includes a plurality of agents to perform a set of roles associated with a dataset in support of the set of tasks, causing the plurality of agents to perform the set of roles using a first machine-learning model, receiving a set of role results from the plurality of agents responsive to performing the set of roles, performing the set of tasks using at least a second machine-learning model, and providing a task result for display on a user interface device. The set of tasks may include executing an operation on the set of role results using the second machine-learning model, and generating a task result that includes a product of the operation executed on the set of role results.

20 Claims, 13 Drawing Sheets

| | | |
|---|---|---|
| Agent Group: | customer segment agents | 400 |
| Agent 1: | in-segment agent | 402, 404 |

| Parameters: | | |
|---|---|---|
| Role 1 | collect responses for in-segment respondents | 410, 412 |
| Context | - seeking quality and relevant quotes<br>- context is sized for the model to answer a single question | 416 |
| Behavior | - represent a point of view for the in-segment<br>- respond with validating data instances<br>- abstain from responses that cannot be validated | 418 |
| Rules | - generative model<br>- single-query/single-response<br>- ask and forget strategy | 410 |

⋮

| | | |
|---|---|---|
| Agent n: | out-segment agent | 402, 406 |

| Parameters: | | |
|---|---|---|
| Role n | collect responses for in-segment respondents | 410, 414 |
| Context | - seeking quality and relevant quotes<br>- context is sized for the model to answer a single question | 416 |
| Behavior | - represent a point of view for the out-segment<br>- respond with validating data instances<br>- abstain from responses that cannot be validated | 418 |
| Rules | - generative model<br>- single-query/single-response<br>- ask and forget strategy | 420 |

FIG. 4A

| | | |
|---|---|---|
| Agent Group: | customer segment agents | 400 |
| Agent 1: | in-segment agent | 402, 404 |

Agent dataset query  
422, 424

You are a in-segment group of a user experience test respondent population. When you answer a question you must provide at least two quotes that validate your perspective. If you cannot find two quotes, you must answer in a way that communicates that you are unable to answer the question.

result  
426, 428

- We have in-house programs that can handle ALL our needs and do not have to worry about some 3rd party software messing with its compatibility or security
- It goes to the cost vs benefits of the solution
- I want a free trial to find out if it's right for me, I don't want to pay a monthly fee
- Too many plans ... not pertinent for my small business
- If the company were to use the golden rule when building a website, MAYBE other people may be more interested being able to read text
- The software is definitely a tool that I can use. The information is too much for me.
- It seems very complicated and costly, hard to get started
- I have tried it and it's not a very simple program and there's a cost for everything
- Not directed toward my business
- Starts with costs, not benefits
- It's not a trust thing more than they charge for stuff after your subscription
- SMALL Text unreadable without eye strain
- Its a lot at first glance
- Too many links to sales
- Monthly expense is highlighted, not benefit for my business
  ⋮
- Is this page targeting new and recurring customers?

FIG. 4B

| | | |
|---|---|---|
| Agent Group: | customer segment agents | 400 |
| Agent n: | out-segment agent | 402, 406 |

Agent dataset query 422, 430: You are an out-segment group of a user experience test respondent population. When you answer a question you must provide at least two quotes that validate your perspective. If you cannot find two quotes, you must answer in a way that communicates that you are unable to answer the question.

result 432:
- I don't need all the resources offered even with the cheapest plan.
- Some of it feels a little bit like a hard sell.
- There could have been more details.
- There is a lot of information presented all at once.
- Same thing other companies offer
- When you do not like a company, nothing really matters.
- It seems like there's enough options that it could get confusing and end up costing more than you need.
- There are too many different sections as you scroll down
- I would need to actually understand what I need and I don't, so I don't know what I should pick.
- Expensive and probably hiring non professionals to do your books
- It is a subscription which makes me not want this.
- Too much going on, not sure where to focus
- Although a lot of information can be a good thing, it has too much info and too many options. It has a lot of clutter.
- I have a very small business, a home daycare with only 7 clients.
- This company allowed my personal business information to be stolen!
- It was a lot of information to take in - especially when you don't need all the information. But at the same time, some businesses would benefit from this information. It was hard to pick three words because I had to put myself in someone else's shoes.
- ⋮
- The big packages. I don't think I need that much.

FIG. 4C

Role Results

Role Result 1: _428_

- We have in-house programs that can handle ALL our needs and do not have to worry about some 3rd party software messing with its compatibility or security
- It goes to the cost vs benefits of the solution
- I want a free trial to find out if it's right for me, I don't want to pay a monthly fee
- Too many plans ... not pertinent for my small business
- If the company were to use the golden rule when building a website, MAYBE other people may be more interested being able to read text
- The software is definitely a tool that I can use. The information is too much for me.
- It seems very complicated and costly, hard to get started
- I have tried it and it's not a very simple program and there's a cost for everything
- Not directed toward my business
- Starts with costs, not benefits
- It's not a trust thing more than they charge for stuff after your subscription
- SMALL Text unreadable without eye strain
- Its a lot at first glance
- Too many links to sales
- Monthly expense is highlighted, not benefit for my business
- Is this page targeting new and recurring customers?

Role Result n: _432_

- I don't need all the resources offered even with the cheapest plan.
- Some of it feels a little bit like a hard sell.
- There could have been more details.
- There is a lot of information presented all at once.
- Same thing other companies offer
- When you do not like a company, nothing really matters.
- It seems like there's enough options that it could get confusing and end up costing more than you need.
- There are too many different sections as you scroll down
- I would need to actually understand what I need and I don't, so I don't know what I should pick.
- Expensive and probably hiring non professionals to do your books
- It is a subscription which makes me not want this.
- Too much going on, not sure where to focus
- Although a lot of information can be a good thing, it has too much info and too many options. It has a lot of clutter.
- I have a very small business, a home daycare with only 7 clients.
- This company allowed my personal business information to be stolen!
- It was a lot of information to take in - especially when you don't need all the information. But at the same time, some businesses would benefit from this information. It was hard to pick three words because I had to put myself in someone else's shoes.
- The big packages. I don't think I need that much.

Task A: You are a helpful user experience researcher. Provide the most common topics mentioned in the quotes from the in-segment group.                                    500, 504

Task result A: The most common topics mentioned in the quotes are:                                    502, 506

1. Cost and pricing concerns:
   - "It goes to the cost vs benefits of the solution."
   - "I want a free trial to find out if it's right for me, I don't want to pay a monthly fee."
   - "It seems very complicated and costly, hard to get started."
   - "There's a cost for everything."
   - "Monthly expense is highlighted, not benefit for my business."

2. Complexity and usability issues:
   - "The information is too much for me."
   - "I have tried it and it's not a very simple program."
   - "Its a lot at first glance."

3. Relevance to specific businesses:
   - "Too many plans ... not pertinent for my small business."
   - "Not directed toward my business."
   - "Is this page targeting new and recurring customers?"

4. Design and readability concerns:
   - "IF the company were to use the golden rule when building a website, MAYBE other people may be more interested being able to read text."
   - "SMALL Text unreadable without eye strain."
   - "Too many links to sales."

5. Trust and security:
   - "We have in-house programs that can handle ALL our needs and do not have to worry about some 3rd party software messing with its compatibility or security."
   - "It's not a trust thing more than they charge for stuff after your subscription."

FIG. 5A

| | |
|---|---|
| Task B: | You are a helpful user experience researcher. Provide the most common topics mentioned in the quotes from the out-segment group.  500, 508 |
| Task result B: | The most common topics mentioned in the quotes are:  502, 510<br><br>1. Overwhelming amount of information and options:<br>  - "There is a lot of information presented all at once."<br>  - "Too much going on, not sure where to focus."<br>  - "Although a lot of information can be a good thing, it has too much info and too many options. It has a lot of clutter."<br><br>2. Concerns about the pricing and subscription model:<br>  - "I don't need all the resources offered even with the cheapest plan."<br>  - "It seems like there's enough options that it could get confusing and end up costing more than you need."<br>  - "It is a subscription which makes me not want this."<br><br>3. Comparisons to other companies and services:<br>  - "Same thing other companies offer."<br>  - "When you do not like a company, nothing really matters."<br><br>4. Difficulty in understanding and choosing the right options:<br>  - "There could have been more details."<br>  - "I would need to actually understand what I need and I don't, so I don't know what I should pick."<br><br>5. Negative experiences and trust issues:<br>  - "This company allowed my personal business information to be stolen!"<br>  - "Expensive and probably hiring non professionals to do your books."<br><br>6. Suitability for small businesses:<br>  - "I have a very small business, a home daycare with only 7 clients."<br>  - "The big packages. I don't think I need that much." |

FIG. 5B

| | |
|---|---|
| Task C: | You are a helpful user experience researcher. Provide any of the most-common topics for the in-segment group that are not among the most-common topics for the out-segment group. <u>500, 512</u> |
| Task result C: | The topics for the in-segment group that are not among the topics for the out-segment group are:<br><br>1. Complexity and usability issues<br>2. Relevance to specific businesses<br>3. Design and readability concerns<br>4. Trust and security <u>502, 514</u> |

FIG. 5C

| | |
|---|---|
| Task D: | You are a helpful user experience researcher. For later reference, the list of topics in the previous task result will be referred to as "distinct topics." Check whether there was at least one distinct topic. Respond with "yes" or "no." <u>500, 516</u> |
| Task result D: | Yes <u>502, 518</u> |

FIG. 5D

| | |
|---|---|
| Task n: | You are a helpful user experience researcher. Rework the distinct topics to be a single, complete sentence for each topic followed by validating quotes as sub-bullets.<br>500, 520 |
| Task result n: | 502, 522<br>1. Users face complexity and usability issues with the program.<br>  - "The information is too much for me."<br>  - "I have tried it and it's not a very simple program."<br>  - "Its a lot at first glance."<br><br>2. The solution's relevance to specific businesses is a concern.<br>  - "Too many plans ... not pertinent for my small business."<br>  - "Not directed toward my business."<br>  - "Is this page targeting new and recurring customers?"<br><br>3. Design and readability concerns affect user experience.<br>  - "IF the company were to use the golden rule when building a website, MAYBE other people may be more interested being able to read text."<br>  - "SMALL Text unreadable without eye strain."<br>  - "Too many links to sales."<br><br>4. Trust and security are important factors for users.<br>  - "We have in-house programs that can handle ALL our needs and do not have to worry about some 3rd party software messing with its compatibility or security."<br>  - "It's not a trust thing more than they charge for stuff after your subscription." |

FIG. 5E

| | |
|---|---|
| Subsequent task 1: | You are a helpful user experience researcher. Provide a statistical significance of the distinct topics. Respond with a p-value.<br>500, 524 |
| Subsequent task result 1: | P-value = 0.85<br>502, 526 |

FIG. 5F

PROMPT MANAGEMENT SYSTEMS FOR MODERATING GENERATIVE ARTIFICIAL INTELLIGENCE OPERATIONS

INCORPORATION BY REFERENCE; DISCLAIMER

This application is hereby incorporated by reference: application No. 63/497,029 filed on Apr. 19, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to generative artificial intelligence (AI) as well as prompt engineering, including the use of prompting systems to cause generative AI models to analyze and transform datasets. The presently disclosed subject matter may be implemented in the context of market research or user experience design, among others.

BACKGROUND

Generative AI systems may be utilized to analyze large datasets. Generative AI systems may use machine-learning models that include a neural network with numerous parameters (typically billions or more) that have been trained on large quantities of unlabeled text using self-supervised learning. A generative AI system may produce media such as text, images, or others, in response to prompts. The media produced in response to the prompts may reveal insights about the datasets that are difficult to efficiently access without use of the generative AI system.

The content of this background section should not be construed as prior art merely by virtue of its presences in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4A illustrates example configurations of agents in accordance with some embodiments;

FIG. 4B illustrates an example role performed by an agent in accordance with some embodiments;

FIG. 4C illustrates another example role performed by an agent in accordance with some embodiments;

FIG. 4D illustrates example role results from an agent group in accordance with some embodiments;

FIG. 5A illustrates an example task executed by a moderation engine and a corresponding task result generated based on a role results from a first agent an agent group in accordance with some embodiments;

FIG. 5B illustrates another example task executed by a moderation engine and a corresponding task result generated based on a role result from a second agent of an agent group in accordance with some embodiments;

FIG. 5C illustrates an example task and a corresponding task result generated by a moderation engine based on a preceding task result in accordance with some embodiments;

FIG. 5D illustrates another example task and a corresponding task result generated by a moderation engine based on a preceding task result in accordance with some embodiments;

FIG. 5E illustrates another example task and a corresponding task result generated by a moderation engine based on a preceding task result in accordance with some embodiments;

FIG. 5F illustrates an example subsequent task and a corresponding subsequent task result generated by a moderation engine in accordance with some embodiments.

DETAILED DESCRIPTION

Figure 1:
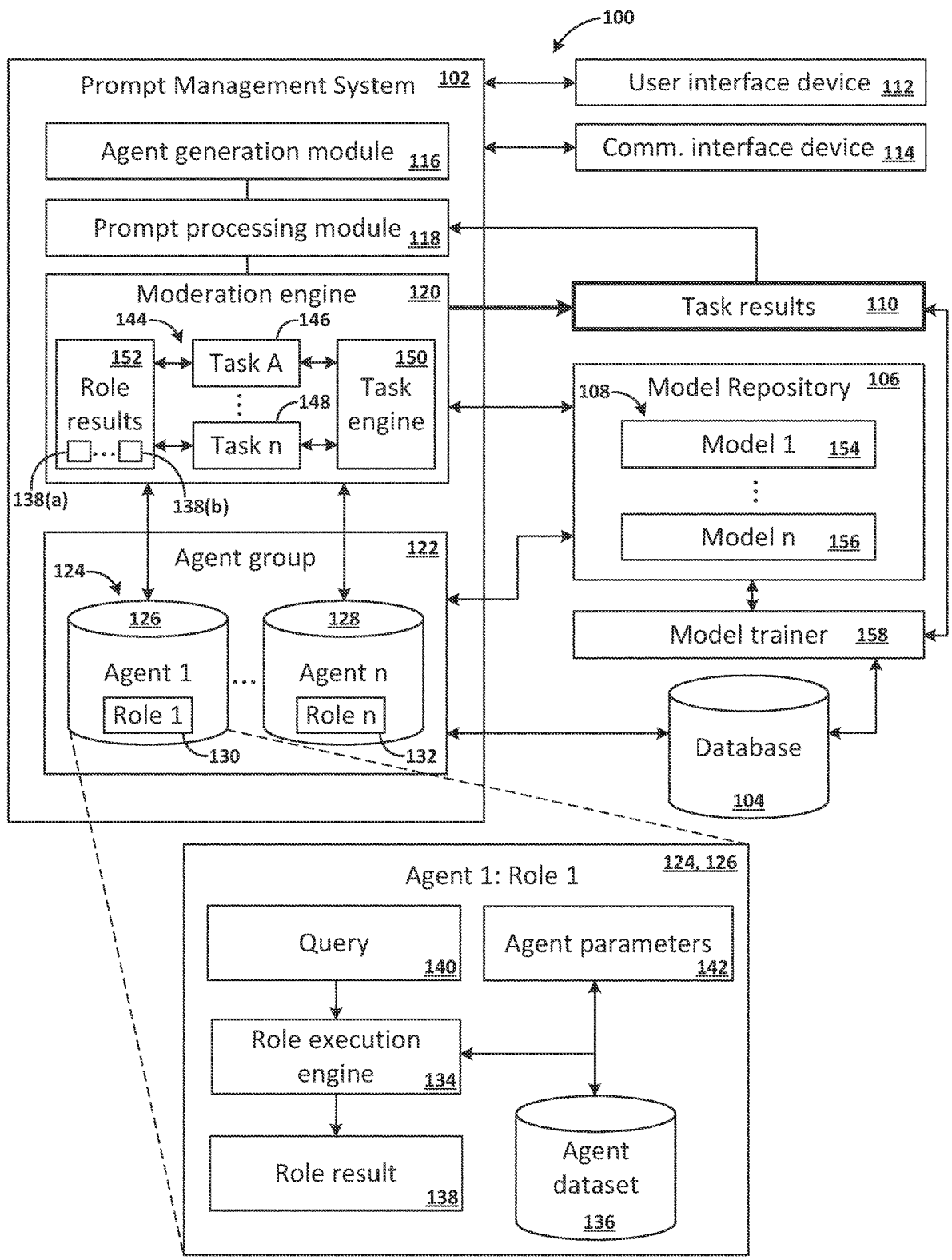
FIG. 1 illustrates one example of a system architecture that includes a prompt management system in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PROMPT MANAGEMENT SYSTEMS
3. AGENT OPERATIONS
4. MODERATION ENGINE OPERATIONS
5. AGENT CONFIGURATIONS, ROLES, AND ROLE RESULTS
6. MODERATION ENGINE TASKS AND TASK RESULTS
7. HARDWARE OVERVIEW
8. COMPUTER NETWORKS AND CLOUD NETWORKS
9. MICROSERVICE APPLICATIONS
10. MISCELLANEOUS; EXTENSIONS

1. General Overview

The present disclosure provides prompt management systems that may be utilized to moderate operations of a generative AI system. The prompt management system may include a moderation engine and at least one agent group. Operations of the prompt management system may include tasks operations performed by the moderation engine and agent operations performed by a group of agents assigned by the moderation engine to perform roles in support of the task operations. The tasks performed by the moderation engine may be derived from prompts, such as chain-of-thought prompts, provided automatically or based on user inputs. The moderation engine may assign agents to perform roles in support of the tasks, and the roles may be derived from the tasks to be performed by the moderation engine. The roles performed by the agent may include executing operations on a dataset using a machine-learning model and providing role results for use by the moderation engine in performing the tasks. The tasks may include executing operations on the role results using a machine-learning model that may be the same or different from the machine-learning model used by the agents. The moderation engine may generate task results that include a product of the operations executed on the role results.

Advantageously, the presently disclosed prompt management systems may reduce processor capacity consumed by generative AI operations on large datasets. For example, the agents may perform roles that include operations that are capable of producing a role result using a limited number of tokens commensurate with the role of the agent. The role result may facilitate subsequently performed tasks by the moderation engine, which may be performed using a limited number of tokens commensurate with the task. The moderation engine may perform the tasks by executing operations on the role results, for example, rather than on the larger datasets. The role results may include or represent agent datasets that contain the relevant data for the tasks being performed by the moderation engine. The operations executed on the role results by the moderation engine may produce task results that are representative of the complete dataset, by virtue of the agent datasets containing the relevant data for the task being performed. As a result, the presently disclosed prompt management systems may provide high quality results from generative AI operations while reducing processor overhead.

Advantageously, the agents may be configured as general-purpose agents that are not tied to a particular task. As such, the agents may be assigned roles that facilitate performance of a wide variety of tasks. For example, a group of agents may be repurposed for use in a variety of different operations without requiring reconfiguring a new group of agents. In accordance with the present disclosure, the moderation engine may select a group of agents and assign roles to the agents based on the specific tasks that the moderation engine has been prompted to perform. The prompt management system may be utilized to process a series of prompts, including chain-of-thought prompts that may be initiated automatically by a prompt management system and/or in response to questions from a user provided by way of an input from a user interface device. The prompts may additionally include ad-hoc prompts initiated to further analyze a dataset, such as in response to follow-up questions initiated by a user.

The presently disclosed prompt management systems may be implemented in a variety of contexts, including market research, user experience design, search engine optimization, or customer segmentation analysis. As further examples, the presently disclosed prompt management systems may be implemented in the context of healthcare, customer service, engineering, banking and financial services, transportation, supply chain logistics, defense, media and entertainment services, manufacturing, information technology, telecommunications, among others.

In at least one example, the techniques and embodiments described herein may be implemented in the context of a scalable system for integrating panel-based research with user experience testing tools, such as online survey applications. The presently disclosed prompt management systems may be utilized to gain useful insights pertaining to market or customer segmentation, that may facilitate improved user experience designs, such as user experience designs that are tailored to unique characteristics of respective markets or customer segments. User experience design tools may execute operations that guide product design flows based on the insights including recommending and/or implementing modifications to a user interface to optimize the design for a particular segment of users.

This General Overview section is intended to provide a general overview without addressing all aspects of the present disclosure. The full scope of the presently disclosed subject matter is understood from the content of the present disclosure in its entirety.

2. Prompt Management Systems

Referring to FIG. 1, the presently disclosed subject matter is further described. As shown in FIG. 1, a system 100 in accordance with one or more embodiments may be associated with generative artificial intelligence (AI) operations, such as prompt engineering operations, including using generative AI models to analyze and transform datasets.

The system 100 may include a prompt management system 102 and a database 104 communicatively coupled or couplable with one another. The prompt management system 102 may include hardware and/or software configured to carry out various operations in accordance with the present disclosure. The database 104 may include data utilized and/or stored by the prompt management system 102 in association with carrying out various operations. The system 100 may include a model repository 106 that houses one or more models 108 in data storage media for use by the prompt management system 102. The one or more models 108 may include machine-learning models, such as generative AI models. The model repository 106 may include hardware and/or software configured to execute and maintain the models 108 in connection with operations of the prompt management system. The model repository 106 may represent a portion of the prompt management system 102 and/or a portion of the database 104. Additionally, or in the alternative, the model repository 106 may represent a separate facility of the system 100 coupled or couplable to the prompt management system 102 and/or the database 104.

The prompt management system 102 may receive inputs from various sources and may provide outputs to various sources. For example, the inputs may include prompts for the prompt management system 102 may execute operations, and the outputs may include task results 110 generated by the prompt management system 102 as a product of executing tasks that may be responsive to various prompts. Additionally, or in the alternative, the inputs may include data from the database 104 and/or data transmitted to the prompt management system 102 from a source. Additionally, or in the alternative, the outputs may include data to be stored in the database 104 and/or data to be transmitted to a source. By way of example, the source may include an external resource utilized by the prompt management system 102.

The system 100 may include a user interface device 112 communicatively coupled or couplable with the prompt management system 102 and/or the database 104. The user interface may include hardware and/or software configured to facilitate interactions between a user and the prompt management system 102 and/or the database 104.

The system 100 may include a communications interface 114 communicatively coupled or couplable with the prompt management system 102 and/or the database 104. The communications interface 114 may include hardware and/or software configured to transmit data to and/or from the system 100, and or between respective components of the system 100. For example, the communications interface 114 may transmit and/or receive data between and/or among the prompt management system 102, the database 104, the user interface device 112, including transmitting and/or receiving inputs and/or outputs.

As shown in FIG. 1, the prompt management system 102 may include at least one of: an agent generation module 116, a prompt processing module 118, or a moderation engine 120. The agent generation module 116, the prompt processing module 118, and the moderation engine 120 may respectively include hardware and/or software that may represent a portion of the prompt management system 102. In at least one example, the prompt management system 102 may include an agent generation module 116 and/or a prompt processing module 118, and the moderation engine 120 may be provided as an external resource. Additionally, or in the alternative, a prompt processing module 118 and/or an agent generation module 116 may be provided as an external resource. In at least one example, the prompt management system 102 may include at least one agent group 122 that includes a plurality of agents 124. An agent group 122 may include hardware and/or software that may represent a portion of the prompt management system 102 and/or a portion of the database 104. Additionally, or in the alternative, at least one agent group 122 may be provided as an external resource coupled or couplable to the system 100. In at least one example, the prompt management system 102 may include each of an agent generation module 116, a prompt processing module 118, a moderation engine 120, and an agent group 122.

The plurality of agents 124 in the agent group 122 may be respectively configured to perform a role that facilitates one or more tasks performed by the moderation engine 120. By way of example, the agent group 122 may include a first agent 126 and a second agent 128. The first agent 126 may perform a first role 130. The second agent 128 may perform a second role 132. As shown in FIG. 1 an agent 124, such as the first agent 126, may include a role execution engine 134 and an agent dataset 136. The role execution engine 134 may include hardware and/or software configured to cause the agent 124 to perform a role (e.g., the first role 130) assigned to the agent 124 and to generate and/or output a role result 138. The agent dataset 136 may include data generated or referenced by the agent 124 in performance of the role.

An agent 124 may perform a role by executing one or more operations using the role execution engine 134. The operations may be executed responsive to a query 140 from the moderation engine 120. The query 140 may include at least one question and at least one response constraint for the role execution engine 134. The role execution engine 134 may include instructions executable to cause the role execution engine 134 to interact with a model 108, such as a machine-learning model, from the model repository 106. Additionally, or in the alternative, the instructions may be included with or represent a portion of the query 140. The interaction with the model 108 may include executing at least one operation on data in the database 104 to generate and/or collect an agent dataset 136. Additionally, or in the alternative, the interaction with the model 108 may include executing at least one operation on data in the agent dataset 136, such as data generated and/or stored in the agent dataset 136 in connection with a preceding operation.

The agent 124 may operate in accordance with one or more agent parameters 142. The at least one constraint may include and/or may reference one or more of the agent parameters 142. The agent parameters 142 may include at least one of: a definition of the role to be performed by the agent 124, a context within which the role is to be performed, a behavior of the agent 124, or rules for the agent 124 to follow. The agent parameters 142 may be housed in the agent dataset 136 and/or the database 104. In at least one example, the agent dataset 136 may include a dataset from the database 104. Additionally, or in the alternative, the agent dataset 136 may represent a portion of the database 104.

The agent 124 may output the role result 138 to the moderation engine 120. Additionally, or in the alternative, the role result 138 may be stored in a role result repository that may define a portion of the agent dataset 136 and/or the database 104. The role result 138 may include at least a portion of the agent dataset 136. Additionally, or in the alternative, the role result 138 may be generated by executing at least one operation on data in the agent dataset 136. The agent 124 may interact with the agent dataset 136, for example, in connection with at least one of: performance of the role, generating a role result 138, or outputting the role result 138 (e.g., to the moderation engine 120).

The agent generation module 116 may be configured to generate and/or configure various agent groups 122 including a plurality of agents 124. The agent generation module 116 may generate and/or configure the agents 124, add the agents 124 to an agent group 122. A respective agent group may be configured, for example, based on a collective role to be performed by the agents 124 in the agent group 122. The respective agents 124 may be configured based on the role to be performed by the respective agent 124. In at least one example, the agent generation module 116 may add agents 124 to an agent group 122 and/or remove agents 124 from an agent group 122, such as newly generated or previously existing agents 124 and/or agent groups 122. Various operations of the agent generation module 116 may be performed responsive to inputs from the user interface device 112, such as by way of an application program interface (API). Additionally, or in the alternative, operations of the agent generation module 116 may be performed automatically, such as by the moderation engine 120. For example, the moderation engine 120 may cause the agent generation module 116 to configure an agent group 122 based on a prompt for the moderation engine 120 to execute one or more tasks 144. The agent group 122 may be configured to perform precursor roles that facilitate the one or more tasks executed by the moderation engine 120.

The prompt processing module 118 may be configured to generate and/or provide prompts to the moderation engine 120. The prompts may prompt the moderation engine 120 to execute tasks 144. The prompts from the prompt processing module 118 may be initiated automatically, and/or responsive to inputs from a user interface device 112, such as by way of an application program interface (API). In at least one example, the prompts may be based on a question or a set of questions. The set of questions may be organized as a group, a series, or a sequence, or the like. The set of questions and/or the corresponding prompts may include depend on, or may be based on, one or more logical connectives, such as at least one of: NOT, AND, OR, IF . . . THEN, IF, IF-AND-ONLY-IF, NOT BOTH, NEITHER . . . NOR, or BUT NOT. For example, the set of questions and/or the corresponding prompts may include alternates that may be presented depending on the status of at least one logical connective. In at least one example, a user may provide questions, via the user interface device 112. Additionally, or in the alternative, questions and/or corresponding prompts may be stored in the database 104, for example, for reference by the prompt processing module 118 in connection with various operations of the system 100. For example, the prompt processing module 118 may reference a set of prompts in the database 104 for a task or series of tasks that correspond to a question. In at least one example, the prompt processing module 118 may generate and/or provide a set of prompts based on or responsive to a precursor question. Additionally, or in the alternative, the prompt processing module 118 may generate and/or provide a set of prompts based on or responsive to a task result 110. For these or other various sources of a question, the prompt processing module 118 may generate and/or provide prompts to the moderation engine 120 configured to cause the moderation engine 120 to execute tasks. The prompts may be configured by the prompt processing module 118 to cause the moderation engine 120 to return task results 110 that are responsive to the particular question or set of questions.

In at least one example, the agent generation module 116 may configure an agent group 122, and/or one or more agents 124 of the agent group 122, based on prompts generated or provided by the prompt processing module 118. For example, the agents 124 and/or the agent group 122 may be configured to perform roles that are configured to produce role results 138 that facilitate the tasks 144 performed by the moderation engine 120 in response to the prompts.

The moderation engine 120 may perform a plurality of tasks 144 responsive to prompts from the prompt processing module 118. The moderation engine 120 may include a task engine 150 configured to perform the tasks 144. By way of example, the tasks 144 may include a first task 146 and/or a second task 148. The tasks 144 may be performed using at least one of the models 108 from the model repository 106, such as at least one machine-learning model. The tasks 144 may include executing operations on a set of role results 138, provided by an agent group 122. The role results 138 may be housed in a role result repository 152, for example, in the database 104 and/or in the respective agent datasets 136. The role results 138 may include a first role result 138(a) corresponding to a first role 130 performed by a first agent 126, and/or a second role result 138(b) corresponding to a second role 132 performed by a second agent 128.

The moderation engine 120 may generate a task result 110 that includes a product of at least one operation executed on the set of role results 138 using one or more of the models 108 from the model repository 106. The task result 110 may represent a product of one or more tasks 144. For example, the first task 146 and the second task 148 may respectively produce a task result 110, and/or a task result 110 may be produced upon having performed a set of tasks 144. In at least one example, the first task 146 may include an operation executed on the set of role results 138, such as an operation executed on the first role result 138(a), using a first model 154. Additionally, or in the alternative, the second task 148 may include an operation executed on the set of role results 138, such as an operation executed on the second role result 138(b), using a second model 156. The task results 110 generated by the moderation engine 120 may be provided for display on a user interface device 112. Additionally, or in the alternative, the task results 110 may provide a basis for the prompt processing module 118 to provide additional prompts to the moderation engine 120 to perform additional tasks 144.

The model repository 106 may include various models 108 that may be suitable for various types of tasks 144. The moderation engine 120 may determine a suitable model 108 for a task 144, for example, based on the prompt from the prompt processing module 118. Additionally, or in the alternative, the prompt processing module 118 may determine models 108 to be used by the moderation engine 120.

For example, a prompt from the prompt processing module 118 may identify one or more models 108 to be used in performing one or more tasks 144 corresponding to the prompt.

The models 108 in the model repository 106 may include one or more machine-learning models. In at least one example, the one or more machine-learning models may include at least one generative AI model. A generative AI model may be configured to generate text, images, or other media in response to prompts. A generative AI model may utilize one or more statistical models to generate classifiers that represent a joint probability distribution P(X, Y) with respect to an observable variable X and a target variable Y. The classifiers may represent the conditional probability of the observable variable X, given the target variable Y. The classifiers may include naive Bayes classifiers and/or linear discriminant classifiers. By way of example, a generative AI model may include at least one of: a Gaussian mixture model, a non-Gaussian mixture model, a Hidden Markov model, a Probabilistic context-free grammar model, a Bayesian network model, an Averaged one-dependence estimator model, a Latent Dirichlet allocation model, a Boltzmann machine model, a Variational autoencoder model, a Generative adversarial network model, a Flow-based generative model, an Energy based model, or a Diffusion model.

In at least one example, a machine-learning model, such as a generative AI model, may operate on at least one of: text, code, images, molecules, music, video, or a combination of these. Example generative AI models include ChatGPT, Bard, AlphaFold, Stable Diffusion, Midjourney, Gen1, Make-A-Video, and DALL-E.

In at least one example, the one or more machine-learning models, such as a generative AI model, may include a deep learning model, such as a large language model. A large language model may include a neural network that has been trained on unlabeled text using self-supervised learning. In at least one example, the large language model may include an autoregressive language model. An autoregressive language model may include a feed-forward component that can predict future values from past values. Example autoregressive language models include GPT-Neo, GPT-NeoX, or GPT-NeoX-20B. Further example large language models include BERT, GPT-2, GPT-3, GPT-4, GPT-J, LaMDA, LLAMA, Chinchilla, Minerva, Galactica, Alexa™, Falcon, BLOOM, SMILES, or PanGu-2.

In at least one example, a machine-learning model may include an algorithm that can be iterated to learn a target model f that best maps a set of input variables to an output variable, using a set of training data. The training data may include datasets and associated labels. The datasets may be associated with input variables for the target model f. The associated labels may be associated with the output variable of the target model f. The training data may be updated based on, for example, feedback on the accuracy of the current target model f. Updated training data may be fed back into the machine-learning algorithm, which in turn may update the target model f. A machine-learning model may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, back-propagation, and/or clustering.

The particular models 108 used by the system 100 may be the same or different as between the roles of the agents 124 of an agent group 122 and the tasks 144 performed by the moderation engine 120. For example, the moderation engine 120 may utilize a first model 154 to perform at least one task 144, such as a first task 146, and an agent 124, such as the second agent 128, may utilize a second model 156 in performance of the second role 132. As a further example, the first agent 126 may utilize the first model 154 in performance of the first role 130. As yet a further example, the moderation engine 120 may utilize the first model 154 to execute the first task 146, including at least on operation executed upon the first role result 138(*a*). Additionally, or in the alternative, the moderation engine 120 may utilize the second model 156 to execute the second task 148, including at least one operation executed upon the second role result 138(*b*).

In one example, the system 100 may include a model trainer 158. The model trainer 158 may train, update, and/or retrain one or more of the models 108, which may include one or more machine-learning models. In one example, the model trainer 158 may retrain or update one or more machine-learning models based on outputs from the one or more machine-learning models. The outputs from the one or more machine-learning models may be included in a training dataset. In one example, the model trainer 158 may retrain or update a first machine-learning model based at least in part on a set of one or more role results. The set of one or more role results may be generated by one or more agents that utilize the first machine-learning model. In one example, the model trainer 158 may retrain or update a second machine-learning model based at least in part on a set of one or more task results generated, for example, by the second machine-learning model. In one example, a training dataset utilized to train, update, and/or retrain a machine-learning model may include one or more sets of outputs from the one or more machine-learning models, such as one or more sets of role results and/or one or more sets of task results. In one example, the training datasets may include feedback on the accuracy of a current target model f, generated, for example, based at least in part on user scores. The user scores may correspond to the accuracy of role results and/or task results generated by the one or more machine-learning models. The training datasets may be stored in the database 104.

3. Agent Operations

The prompt management system may include one or more agent groups. The moderation engine 120 may configure the agent groups. Additionally, or in the alternative, the moderation engine 120 may moderate various operations of the agent groups. In at least one example, the one or more agent groups may be configured by the moderation engine 120 responsive to prompts from the prompt processing module.

Figure 2B:
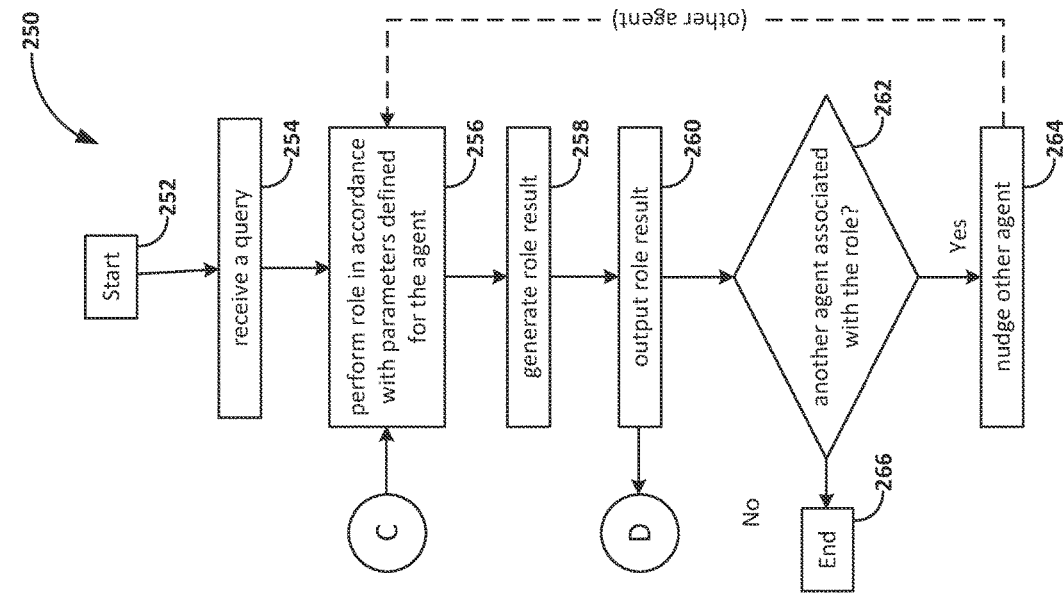
FIG. 2B illustrates example operations of agents in accordance with some embodiments.
Figure 2A:
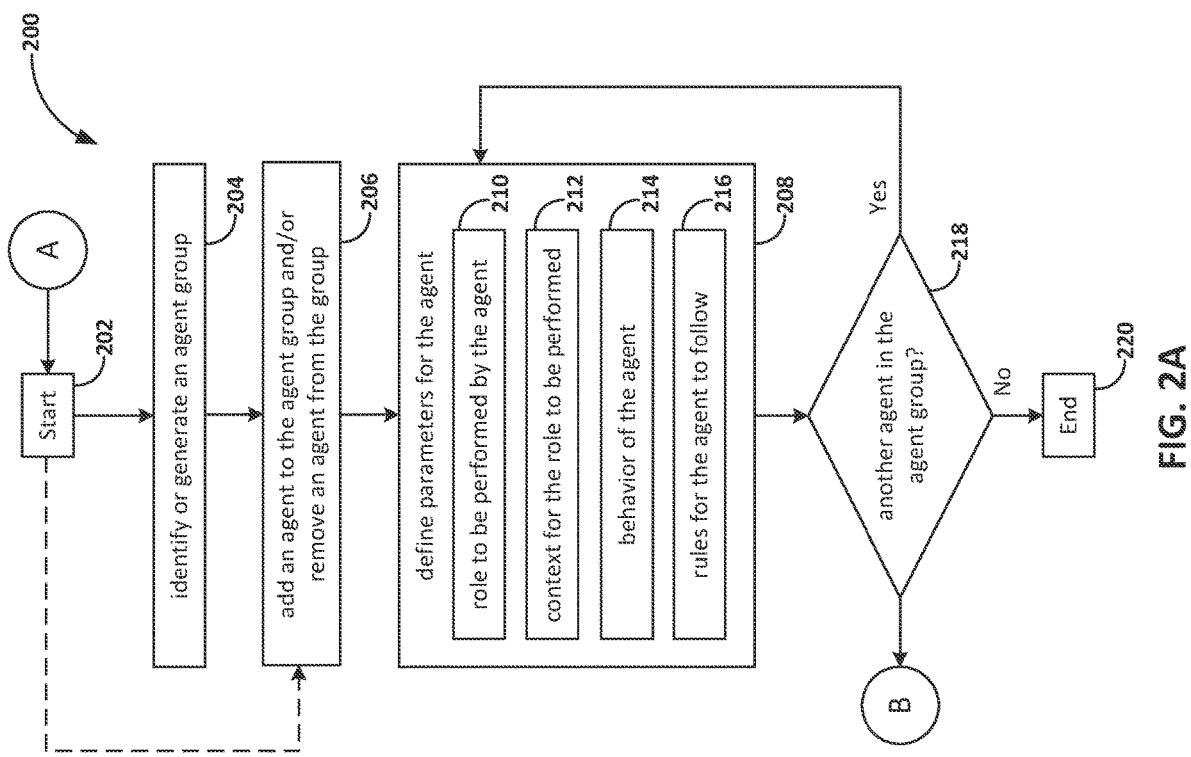
FIG. 2A illustrates example operations associated with adding agents to agent groups of a prompt management system in accordance with some embodiments.

Referring to FIG. 2A, operations associated with an agent group may include configuration operations 200. The one or more configuration operations 200 may be performed, for example, by the moderation engine 120, to configure an agent group and/or one or more agents of the agent group. One or more configuration operations 200 described with reference to FIG. 2A may be modified, rearranged, or omitted all together. Accordingly, the particular sequence of operations described with reference to FIG. 2A should not be construed as limiting the scope of one or more embodiments. A set or series of configuration operations 200 may start at block 202, or elsewhere in the operation blocks shown in FIG. 2A.

Example configuration operations 200 may include, at block 204, identifying or generating an agent group. An agent group may be identified by the moderation engine 120. The moderation engine 120 may search the database 104 for an agent group. An agent group may be selected that corresponds to a prompt or a set of prompts from the prompt processing module 118, and/or that corresponds to one or more tasks to be performed by the moderation engine 120. The agent group selected by the moderation engine 120 may include unnecessary or unsuitable agents, and/or the agent group selected may lack one or more agents that may be necessary or helpful to include in the agent group. The moderation engine 120 may modify the agent group, for example, to achieve desired role results from the agent group.

In at least one example, the configuration operations 200 may include, at block 206, adding one or more agents to the agent group. Additionally, or in the alternative, one or more agents may be removed from the agent group. The configuration operations 200 may proceed from block 204, or when an agent group has already been identified or generated, the configuration operations 200 may start at block 206. In at least one example, one or more agents may be retained in the agent group, for example, as identified at block 204. Adding an agent to the agent group may include generating a new agent and/or selecting an existing agent, such as from the database 104. In at least one example, the database 104 may include a plurality of agents that are pre-configured for various roles, and/or or that may provide template or shell of an agent to be further configured by the moderation engine 120.

An agent may be added to the agent group by confirming permissions for adding an agent to the agent group and executing one or more operations configured add the agent to the agent group. For a new agent, the operations may include generating information for the agent, such as an identifier, a description, one or more executable instructions, and one or more agent parameters. The operations may include defining the executable instructions for the role execution engine 134, allocating space in a data structure for the agent dataset, allocating space in the data structure for the agent parameters 142, and defining at least some of the agent parameters 142. Various elements in the system may receive a notification that an agent has been added to the agent group.

An agent may be removed from the agent group by confirming permissions for removing the agent from the agent group and executing one or more operations configured to remove the agent to the agent group. Various elements in the system may receive a notification that an agent has been removed from the agent group.

In at least one example, the configuration operations 200 may include, at block 208, defining parameters for at least one agent in the agent group. The defining of parameters may include initializing new parameters and/or modifying existing parameters. At block 210, the moderation engine 120 may define a role to be performed by the agent. At block 212, the moderation engine 120 may define a context for the role to be performed by the agent. At block 214, the moderation engine 120 may define a behavior of the agent. The behavior of the agent may include one or more behavioral aspects. At block 216, the moderation engine 120 may define one or more rules for the agent to follow.

In at least one example, a role to be performed by an agent, such as may be defined at block 210, may include receiving a query, and responsive to the query, interacting with at least one model, such as a machine-learning model, to generate and/or collect an agent dataset. The query may include at least one question and at least one response constraint, and the agent dataset may represent a response to the question while satisfying the response constraint.

In at least one example, the context for the role to be performed by an agent, such as may be defined at block 210, may include populating the agent dataset with content that meets at least one quality parameter. The at least one quality parameter may correspond to at least one of: accuracy, completeness, reliability, relevance, or timeliness. Additionally, or in the alternative, the context for the role to be performed by an agent may include confining the role to a query that contains a single question. In at least one example, the agent may have a token limit selected to accommodate the single question.

In at least one example, the behavior of the agent, such as may be defined at block 210, may include representing a specified point of view. The behavior of the agent may include providing a validating data instance, such as from the agent dataset, in support of the specified point of view, and/or abstaining from representing the specified point of view with respect to the agent dataset when the agent dataset lacks a validating data instance.

In some embodiments, the point of view behavior of an agent or group of agents is configured through using steering messages. A steering message is a prompt that explicitly or implicitly specifies the point of view for the agent or group of agents to represent during execution of one or more tasks. For example, a steering message may specify that the agents represent individuals that live in a particular region, that fall within a particular age range, and/or that possess a set of one or more other attributes. Prompt processing module 118 may send the steering message to a machine learning model, such as a generative language model, that has been trained to represent one or more points of view.

In the context of a generative language model, for instance, when the model receives a prompt that explicitly specifies the point of view for the model to adopt, the model may use the prompt to bias its generated output towards the specified perspective. The generative language model may process the prompt, including the explicit specification of the desired point of view, and use the context to set the initial conditions for generating text. The model's internal state may be adjusted based on the prompt. For example, the attention mechanism of a language model using a transformer architecture may emphasize the relevant parts of a prompt that pertain to the specified perspective. Stated another way, the attention mechanism that assigns token-level attention weights, attention scores and/or other attention parameters within the transformer-based language model may operate differently from one simulated point of view to another. Additionally or as an alternative, generative language models may represent different points of view using other mechanisms, such as contextual embeddings that capture the context mentioned in the prompt and/or biasing output toward a perspective. The generative language model may thus generate text while taking into account the specified point of view, which may influence the model's output including the choice of words, phrases, and overall tone of the generated text.

In at least one example, the one or more rules for the agent to follow, such as may be defined at block 210, may include an identification of a model, such as a machine-learning model, to be utilized by the agent. Additionally, or in the alternative, the one or more rules may include a model classifier defining a type of model, such as a type of machine-learning model, to be utilized by the agent. Additionally, or in the alternative, the one or more rules may include a query classifier defining a type of query-response structure to be utilized by the agent.

In at least one example, at block 218, the moderation engine 120 may determine, at block 218, whether there is another agent in the agent group that needs to have parameters defined, and if so, the configuration operations 200 may proceed again to block 208 to define parameters for one or more other agents. Additionally, or in the alternative, the configuration operations 200 may confirm that all agents have properly defined parameters and/or that there are no further agents needing parameters defined, in which case, the configuration operations 200 may conclude at block 220. For example, the moderation engine 120 may compare the parameters to data in a table that specifies various parameter settings. The parameter settings may be determined based at least in part on the respective prompt, role, task, or role result.

Referring to FIG. 2B, agent operations 250 associated with one or more agent groups are further described. One or more agent operations 250 described with reference to FIG. 2B may be modified, rearranged, or omitted all together. Accordingly, the particular sequence of operations described with reference to FIG. 2B should not be construed as limiting the scope of one or more embodiments. The agent operations 250 may be associated with one or more roles performed by the agents in the agent group. The agent operations 250 may differ as between the respective agents based on the particular role performed by an agent. The agent operations 250 may be performed by a respective agent sequentially or concurrently relative to at least one other agent. The agent operations 250 may start at block 252.

With respect to a particular agent, at block 254, the agent operations 250 may include receiving a query. The query may include at least one question and at least one response constraint. The query may be provided to the agent from the moderation engine 120. At block 256, the agent operations 250 may include performing a role in accordance with the query received at block 254. The role may include interacting with a model, such as a machine-learning model, to collect or generate an agent dataset. The agent dataset may respond to the question in the query while satisfying the response constraint in the query.

At block 258, agent operations 250 may include generating a role result. The role result may be generated by the role execution engine 134, for example, by or as a result of collecting or generating an agent dataset. Additionally, or in the alternative, the role result may be generated by the role execution engine 134 by executing one or more operations upon the agent dataset.

In at least one example, at block 260, the agent operations 250 may include outputting the role result. The role result may be added to a role result repository utilized by the moderation engine 120. Additionally, or in the alternative, the role result may be stored as part of the agent dataset. For example, the role result repository may represent a portion of the agent dataset.

At block 262, the agent operations 250 may include determining whether there is another agent in the agent group associated with the role performed at block 256. For example, a first agent may have performed a first role at block 256, and a second agent may have a second role that is related to the first role performed by the first agent. In at least one example, the second role may be dependent and/or contingent upon the first agent having performed the first role. For example, the second role may require and/or utilize a first role result corresponding to the first role.

When, at block 262, it is determined that there is another agent associated with the role performed at block 256, a nudge may be provided to the other agent at block 264. The nudge may be provided by the agent, such as the first agent, to the other agent, such as the second agent. Additionally, or in the alternative, the nudge may be provided by the agent, such as the first agent, to the moderation engine 120, and/or by the moderation engine 120 to the other agent, such as the second agent. In at least one example, the nudge may include and/or cause a query to be provided to the other agent, such as the second agent, at block 254. Additionally, or in the alternative, the nudge may cause the other agent, such as the second agent to begin performing the role at block 256. The agent operations 250 may conclude at block 266 when, at block 262, it is determined that there is not another agent, or that there are no further agents, associated with the role or roles performed by the agent group.

4. Moderation Engine Operations

A moderation engine 120 may execute operations associated with moderating roles performed by an agent group. Additionally, or in the alternative, a moderation engine 120 may execute operations associated with tasks, for example, responsive to prompts from the prompt processing module and/or utilizing role results from the agent group.

Figure 3A:
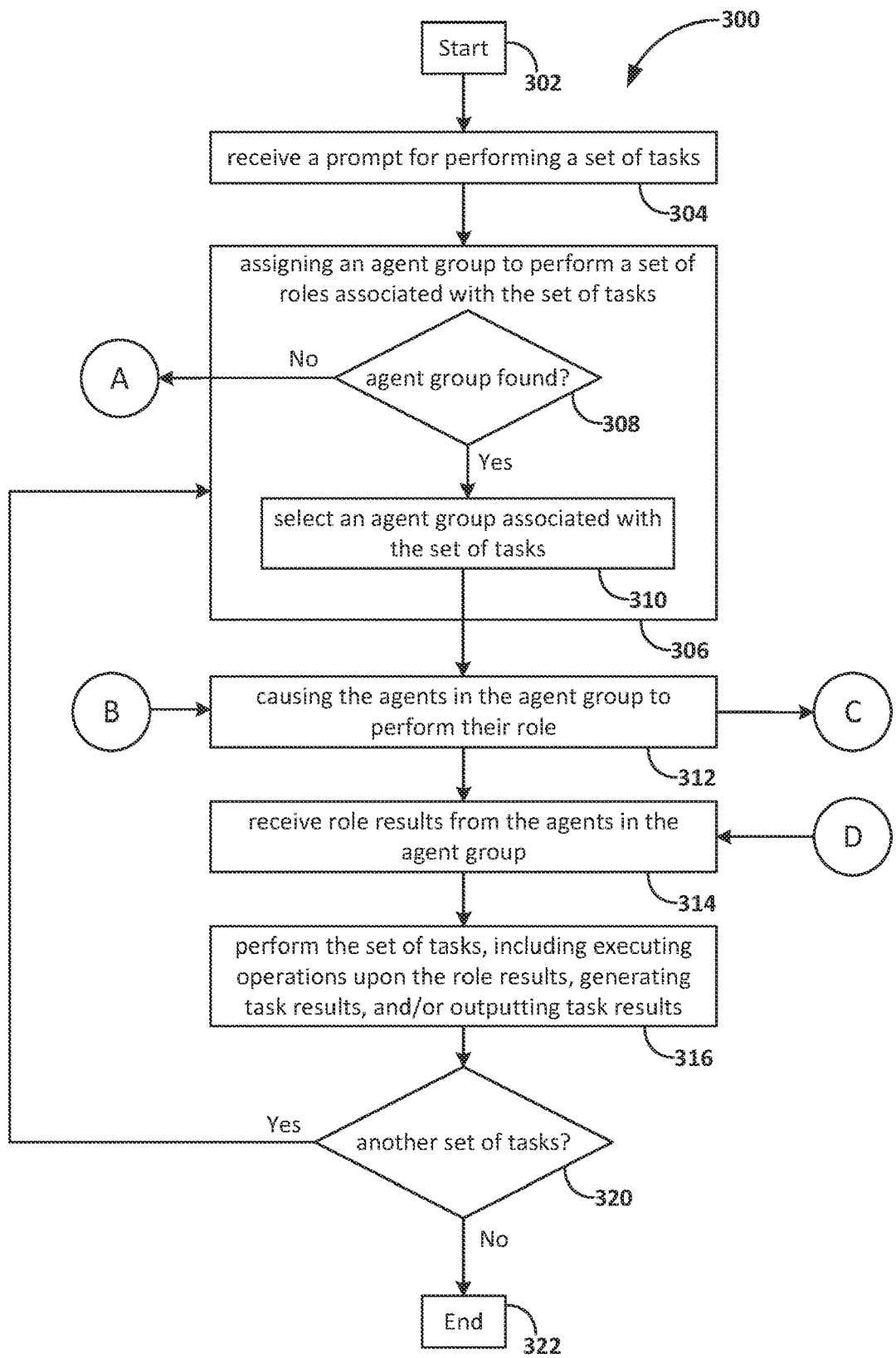
FIG. 3A illustrates example operations associated with a moderation engine of a prompt management system in accordance with some embodiments.

Referring to FIG. 3A, moderation operations 300 are further described. One or more operations executed by a moderation engine 120 may include moderation operations 300. The moderation operations 300 may start at block 302, or elsewhere in the operation blocks shown in FIG. 3A. The moderation operations 300 described with reference to FIG. 3A may be modified, rearranged, or omitted all together. Accordingly, the particular sequence of operations described with reference to FIG. 3A should not be construed as limiting the scope of one or more embodiments.

Example moderation operations 300 may include, at block 304, receiving a prompt for performing a set of tasks. The prompt may be provided by the prompt processing module, for example, responsive to an input from a user interface device and/or a communication interface. Additionally, or in the alternative, the prompt may be initiated automatically.

At block 306, the moderation operations 300 may include assigning an agent group to perform a set of roles in support of the set of tasks. The set of tasks may include a single task or multiple tasks. The set of roles may include one or more roles for one or more of the agents in the agent group. The roles may be associated with an agent dataset, such as generating and/or collecting an agent dataset, or executing one or more operations on the agent dataset. The agent group to which the set of roles are assigned may include a plurality of agents that respectively have a role to perform from the set of roles.

The operation of assigning an agent group to perform the set of roles may include, at block 308, determining whether an agent group is configured to perform the set of roles associated with the set of tasks. Responsive to determining, at block 308, that an agent group is configured to perform the set of roles, the moderation operations 300 may include, at block 310, selecting an agent group for assignment to the set of roles, for example, from among a plurality of candidate agent groups. Upon having selected an agent group at block 310, the moderation operations 300 may proceed with causing the agents in the agent group to perform their respective role, at block 312.

At block 312, the moderation engine 120 may cause the agents in an agent group to perform their respective role using at least one model, such as a machine-learning model. In at least one example, the moderation engine 120 may provide an instruction to one or more of the agents in the agent group. For example, the moderation engine 120 may provide a first instruction to a first agent for the first agent to perform a first role in accordance with one or more agent parameters defined for the first agent. Responsive to the first instruction, the first agent may generate a first role result, and may output the first role result, such as to the role result repository. Additionally, or in the alternative, the moderation engine 120 may provide a second instruction to a second agent for the second agent to perform a second role in accordance with one or more agent parameters defined for the second agent. Responsive to the second instruction, the second agent may generate a second role result, and may output the second role result, such as to the role result repository.

When it is determined that an agent group is not configured to perform the set of roles, the moderation operations 300 may include one or more configuration operations, as indicated at node A, such as one or more configuration operations described with reference to FIG. 2A. The configuration operations may include defining a new agent group, and selecting the new agent group as the agent group to perform the set of roles. In at least one example, the determination that an agent group is not configured to perform the set of roles associated with the tasks may be determined, at block 308, based on a divergence between the set of tasks to be performed and a configuration of the agents in one or more candidate agent groups. Additionally, or in the alternative, the moderation operations 300 may include, at block 308, determining an absence of at least one candidate agent group; and the configuration operations indicated by node A may include defining a new agent group, and selecting the new agent group as the agent group for the set of roles. Upon having performed the one or more configuration operations, the moderation operations 300 may continue with causing the agents in the agent group to perform their respective role, at block 312, as indicated by node B.

As indicated by nodes C and D, the moderation operations 300 may await role results from the respective agents. At node C, causing the agents to perform their respective role indicated at block 312 may include instructing the agents to perform one or more agent operations such as one or more agent operations described with reference to FIG. 2B. At block 314, the moderation operations 300 may include receiving role results from the agents. The role results may be received by the moderation engine 120 responsive to the agents performing agent operations corresponding to the set of roles, as indicated by node D.

Upon receiving role results from the agents, the moderation operations 300 may include, at block 316, performing the set of tasks using at least one model, such as a machine-learning model. In at least one example, the moderation engine 120 may utilize at least one model to perform the set of tasks that differs from at least one model used by one or more of the agents in the agent group. Additionally, or in the alternative, the moderation engine 120 may utilize at least one model that is the same as at least one model utilized by an agent in the agent group.

At block 320, the moderation operations 300 may include determining whether there is another set of tasks to be performed. When there is an additional set of tasks to be performed, the moderation operations 300 may return to block 306, to assign an agent group to perform the additional set of tasks. The moderation operations 300 may conclude at block 322, for example, when there are no further tasks to be performed.

Figure 3B:
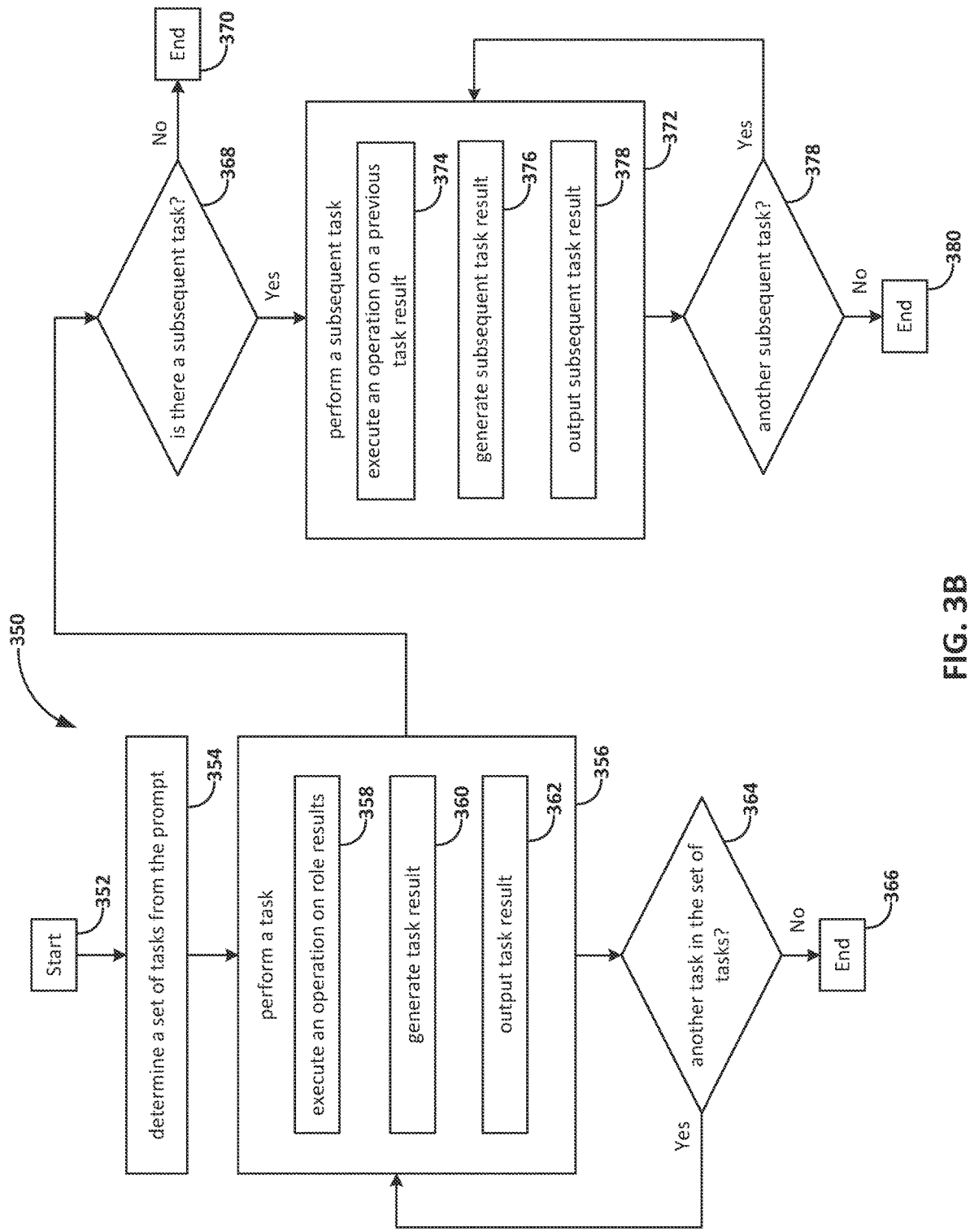
FIG. 3B illustrates further example operations associated with a moderation engine in accordance with some embodiments.

Referring to FIG. 3B, example moderation operations 300 associated with performing tasks are further described. As shown, moderation operations 300 associated with performing tasks may include one or more task operations 350. The task operations 350 may start at block 352, or elsewhere in the operation blocks shown in FIG. 3B. The task operations 350 described with reference to FIG. 3B may be modified, rearranged, or omitted all together. Accordingly, the particular sequence of operations described with reference to FIG. 3B should not be construed as limiting the scope of one or more embodiments.

At block 354, the task operations 350 may include determining a set of tasks to be performed responsive to a prompt, such as from the prompt processing module 118 and/or from one or more of the agents in the agent group associated with the set of tasks.

At block 356, the task operations 350 may include performing at least one task. In at least one example, performing a task may include, at block 358, executing at least one operation on the set of role results using at least one model, such as a machine-learning model. For a respective task, the operations may be executed on at least some of the role results. For example, a first task may include, at block 358, executing a first operation on the set of role results, such as on a first role result, and a second task may include, at block 358, executing a second operation on the set of role results, such as on a second role result. In at least one example, performing a task may include, at block 360, generating at least one task result. The task result may be a product of the at least one operation executed on the set of role results, at block 358. In at least one example, a first task result may be generated from and/or as a product of the first operation executed on the first role result, and a second task result may be generated from and/or as a product of the second operation executed on the second role result. In at least one example, performing a task may include, at block 362, outputting the at least one task result. For example, the task operations 350 may include providing the at least one task result for display on a user interface device. Additionally, or in the alternative, one or more task results may be output to a data repository, such as the database 104, for future reference. For example, a subsequent task operation 350 may be executed upon a task result.

In at least one example, the tasks may be performed responsive to receiving role results from the agents in the agent group associated with the set of tasks. In at least one example, the moderation engine 120 may receive a prompt, such as from one or more agents in the agent group indicating that role results are available for use in performing the set of tasks.

Upon performing a task from a set of tasks, the task operations 350 may proceed from block 356 to block 364, where the task operations 350 may include determining whether the set of tasks includes another task to be performed. When there is another task to be performed, the task operations 350 may proceed again to block 356, to perform the task. When there are no further tasks in the set of tasks to be performed, the task operations 350 may conclude at block 366.

In at least one example, performance of one or more tasks in the set of tasks may prompt performance of a subsequent task. Additionally, or in the alternative, a subsequent task may be prompted by the prompt processing module 118, such as automatically and/or responsive to an input from a user interface device. For example, a subsequent task may correspond to a follow-up inquiry by a user. At block 368, the task operations 350 may include determining whether there is a subsequent task to be performed, such as a subsequent task prompted by a task performed at block 356 or a subsequent task prompted by the prompt processing module 118. When there is not a subsequent task, the task operations 350 may conclude at block 370. When there is a subsequent task to be performed, the task operations 350 may include, at block 372, performing the subsequent task.

Performing the subsequent task may include, at block 374, executing at least one operation on a previous task result, using at least one model, such as a machine-learning model. In at least one example, performing a subsequent task may include, at block 376, generating at least one subsequent task result. The subsequent task result may be a product of the at least one operation executed on the previous task result, at block 374. In at least one example, performing the subsequent task may include, at block 362, outputting the at least one subsequent task result. For example, the task operations 350 may include providing the at least one subsequent task result for display on a user interface device. Additionally, or in the alternative, one or more subsequent task results may be output to a data repository, such as the database 104, for future reference. For example, an additional subsequent task operation 350 may be executed upon a subsequent task result.

Upon performing a subsequent task, the task operations 350 may proceed from block 372 to block 378, where the task operations 350 may include determining whether there is another subsequent task to be performed. When there is another subsequent task to be performed, the task operations 350 may proceed again to block 372, to perform the additional subsequent task. When there are no further subsequent tasks to be performed, the task operations 350 may conclude at block 380.

In at least one example, one or more subsequent tasks may be initiated by prompts from the prompt processing module, and the prompts may include chain-of-thought prompts. The chain-of-thought prompts may be initiated by the prompt processing module in response to a question, such as from the user interface device.

5. Agent Configurations, Roles, and Role Results

Referring now to FIGS. 4A-4D, example agent configurations, roles, and role results are further described. As shown in FIG. 4A, an agent group 400 may be defined for a plurality of customer segments. The agent group 400 may include a plurality of agents 402, such as a first agent 404 (in-segment agent) that represents a first group of customers that belong to a particular customer segment (in-segment respondents). Additionally, or in the alternative, the agent group 400 may include a second agent 406 (out-segment agent) that represents a second group of customers that do not belong to, or that are excluded from, the particular customer segment represented by the first group of customers (out-segment respondents). Additionally, or in the alternative, the agent group 400 may include further agents 402 representing other customer segments. As shown, the respective agents 402 may be assigned at least one role 410.

A first role 412 for the first agent 404 may include collecting responses from a dataset for in-segment respondents. The responses may include a first set of responses from a first group of customers that belong to a particular customer segment. The responses may be stored in a data repository, such as in the database or the agent dataset corresponding to the first agent. The responses may be aggregated and transferred from the database to the agent dataset. The responses may be collected from the agent dataset and provided as a first role result to the role result repository.

Referring further to FIG. 4A, a second role 414 for the second agent 406 may include collecting responses from a dataset for out-segment respondents. The responses may include a second set of responses from a second group of customers that do not belong to, or that are excluded from, a particular customer segment. The responses may be stored in a data repository, such as in the database or the agent dataset corresponding to the second agent. The responses may be aggregated and transferred from the database 104 to the agent dataset. The responses may be collected from the agent dataset and provided as a second role result to the role result repository. The first role result and the second role result may respectively represent at least part of a set of role results. As shown in FIG. 4A, in addition to the role 410 to be performed by the agents 402, the agents 402 may include further agent parameters, including a context 416, a behavior 418, and/or one or more rules 420.

As shown in FIGS. 4B and 4C, an agent 402 may receive a query 422, and may generate a role result 426 responsive to the query 422. For example, the first agent 404 (in-segment agent) may receive a first query 424 pertaining to the first group of customers that belong to a particular customer segment (in-segment respondents), and the first agent 404 may generate a first role result 428 corresponding to the in-segment respondents. As shown, the first role result 428 may include quotes from the in-segment respondents. Additionally, or in the alternative, the second agent 406 (out-segment agent) may receive a second query 430 pertaining to the second group of customers that do not belong to, or that are excluded from, a particular customer segment (out-segment respondents), and the second agent 406 may generate a second role result 432 corresponding to the out-segment respondents. As shown, the second role result 432 may include quotes from the out-segment respondents.

As shown in FIG. 4D, a role result repository 434 may include the first role result 428 corresponding to the in-segment respondents, and the second role result 432 corresponding to the out-segment respondents. The moderation engine 120 may utilize the role results in a role result repository to perform various tasks.

6. Moderation Engine Tasks and Task Results

Referring to FIGS. 5A-5F, example tasks 500 that may be performed by the moderation engine 120 and corresponding task results 502 are further described. As shown in FIG. 5A, a first task 504 for the moderation engine 120 may include determining from the set of role results, a first set of topics mentioned in first set of responses from the first group of customers representing the particular customer segment (the in-segment group). The moderation engine 120 may generate and/or output a first task result 506 that includes the first set of topics. As shown, the first set of topics may include the most common topics mentioned in the quotes from the in-segment respondents.

In at least one example, as shown in FIG. 5B, a second task 508 for the moderation engine 120 may include determining from the set of role results, a second set of topics mentioned in second set of responses from the second group of customers that do not belong to, or that are excluded from, a particular customer segment (out-segment group). The moderation engine 120 may generate and/or output a second task result 510 that includes the second set of topics. As shown, the second set of topics may include the most common topics mentioned in the quotes from the out-segment respondents.

In at least one example, as shown in FIG. 5C, a third task 512 may include determining from the first task result 506 and the second task result 510, a third set of topics mentioned in first set of topics (e.g., the most common topics mentioned in the quotes from the in-segment respondents) that are absent from the second set of topics (e.g., the most common topics mentioned in the quotes from the out-segment respondents), and outputting a third task result 514 that includes the third set of topics. As shown, in FIG. 5C, by way of example, the moderation engine 120 has identified four (4) topics for inclusion in the third set of topics representing topics mentioned in a first set of topics that are absent from the second set of topics.

In at least one example, as shown in FIG. 5D, a fourth task 516 may include determining information pertaining to a previous task result. The previous task result may provide a basis for a contingent task, as shown in FIG. 5E. By way of example, the fourth task 516 may include determining whether the third task result 514 includes at least one distinctive topic (e.g., at least one of the most common topics mentioned in the quotes from the in-segment respondents that is absent from the most common topics mentioned in the quotes from the out-segment respondents). As shown, the fourth task result 518 responsive to the fourth task 516 indicates in the affirmative, that "yes" the third task result 514 includes at least one distinctive topic.

In at least one example, as shown in FIG. 5E, a fifth task 520 may include a contenting task that depends on a previous task result 522, such as the fourth task result 518 shown in FIG. 5D. In performing the fifth task 520 shown in FIG. 5E, the moderation engine 120 may execute an operation on at least one previous task result 522, such as the first task result 506, the second task result 510, the third task result 514, and/or the fourth task result 518. Additionally, or in the alternative, the moderation engine 120 may generate a fifth task result that includes a product of the operation executed on the at least one previous task result 522.

By way of example, the fifth task 520 may include generating a complete sentence for each of the third set of topics included in the third task result 514. Additionally, or in the alternative, the fifth task 520 may include determining from the first task result 506, at least one validating data instance for each of the third set of topics from the third task result 514. Additionally, or in the alternative, the fifth task 520 may include outputting as the fourth task result 518, an organized grouping of the complete sentence and the at least one validating data instance for each of the third set of topics.

In at least one example, as shown in FIG. 5F, a sixth task 524 may represent a subsequent task. The moderation engine 120 may generate a sixth task result 526 that includes a subsequent task result in response to the subsequent task represented by the sixth task 524. The subsequent task may be initiated based on a prompt, such as from the prompt processing module. The subsequent task may be initiated automatically and/or in response to an input from the user interface device, such as a question from a user. In response to the prompt, the moderation engine 120 may perform the subsequent task represented by the sixth task 524 by executing one or more subsequent operations and generating the subsequent task result. The subsequent task result may include a product of the one or more subsequent operations. Additionally, or in the alternative, the subsequent task may represent a request for follow-up information, such as follow-up information about a customer segment represented in at least one of the agent datasets. By way of example, as shown in FIG. 5F, the subsequent task may include providing a statistical significance of a preceding task, such as a statistical significance of the distinctive topics included in the third task result 514. One or more of the task results, including one or more subsequent task results, may be for display on the user interface device.

In one example, the system may perform ad-hoc analysis of test results data, for example, on behalf of customers. In one example, a segment of a respondent population may be defined and/or selected. The segment may be selected and/or defined based at least in part on demographics and/or question responses. For example, question responses may be screened based on one or more demographics criterion or other parameters. In one example, the system may receive questions from a customer via one or more query agents. The moderation engine 120 may disseminate questions received by the system to one or more agents, consolidate responses returned by the one or more agents, and deliver the responses to the customer. Additionally, or in the alternative, one or more agents may compare reasoning across multiple segments, for example, based at least in part on responses corresponding to the respective segments.

In some embodiments, moderation engine 120 sends steering messages to one or more agents responsive to receiving the task prompts, such as those illustrated above. For example, moderation engine 120 may send a steering message to one or more agents to operate from the point of view of an individual that is part of the in-segment and another steering message to one or more agents to operate from the point of view of an individual that is not part of the in-segment. In other cases, more than two segments may be defined. For instance, different segments may be defined for an arbitrary number of regions, age ranges, and/or other set of attributes. The steering messages may configure the agents to act according to a particular perspective, such as by adjusting the attention mechanisms of the underlying generative language model as previously described. The agents may thus provide insights that are specific to a particular segment.

In some embodiments, the insights may be integrated into product design tools and systems. For example, a designer of a website may use a prototype development tool to create multiple different prototypes of the website design. Different prototypes may vary in look, feel, navigation, and/or function. The moderation engine 120 may be a component of the prototype development tool or may be an external service that is invokable by the prototype development tool to gain insights into the different prototype designs across one or more customer segments. The task results may be processed by the prototype development tool to recommend or select a prototype design for live deployment for a particular customer segment. Additionally or alternatively, the prototype development tool may highlight regions within the design, such as in a webpage or application page, to modify based on the insights. The recommended modifications may include changes to the look, feel, navigation, and/or functional aspects of the design. The prototype development tool may present the recommendations through a design interface through which the developer may accept, implement, or reject the design modifications to optimize the design for the customer segment, such as a particular in-segment or out-segment.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
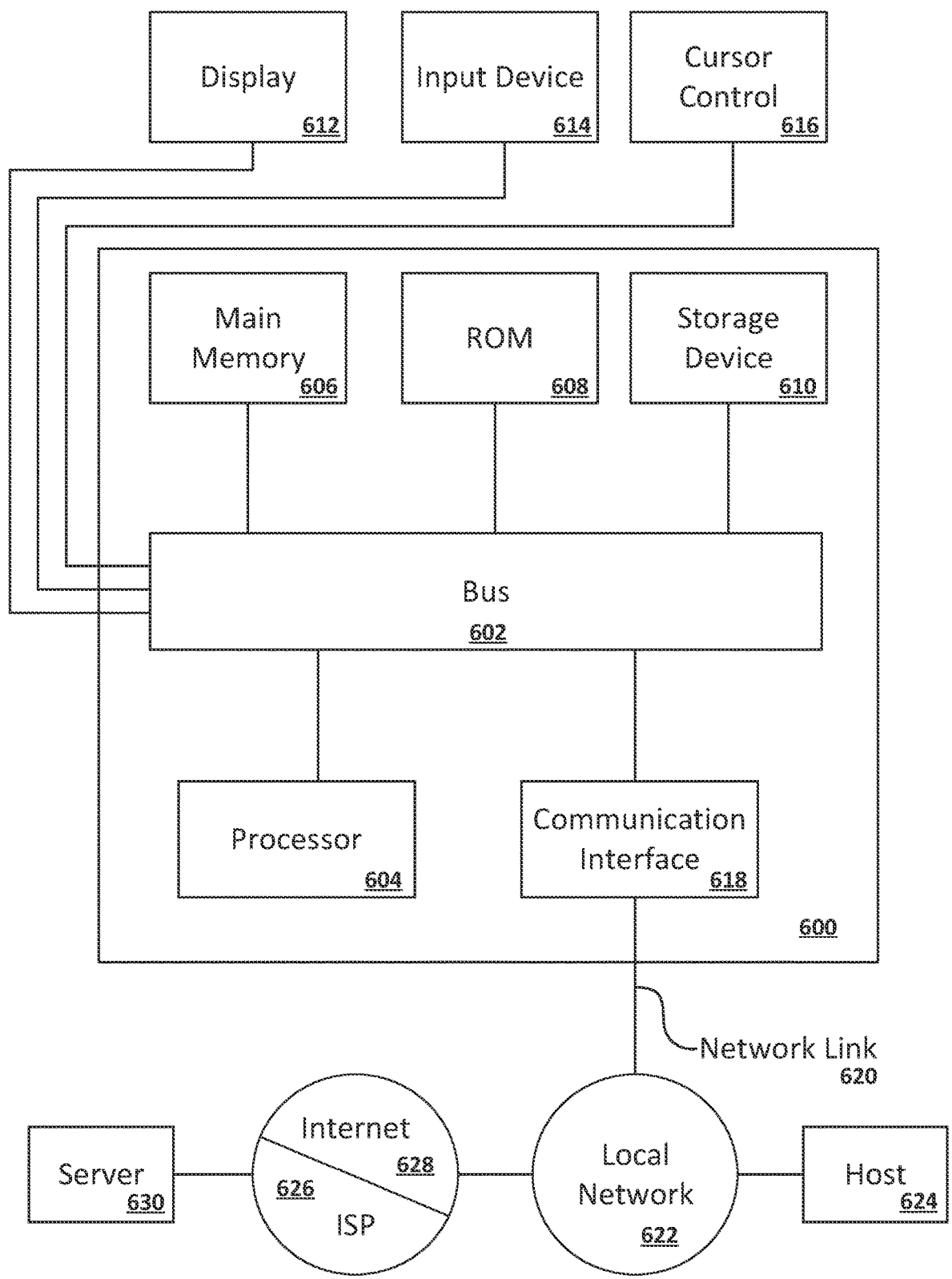
FIG. 6 illustrates a computer system in accordance with some embodiments.

For example, FIG. 6 illustrates a computer system in accordance with some embodiments. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, transform computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Computer Networks and Cloud Networks

In some embodiments, the computer system may be connected to, or distributed across, a computer network. The computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, multiple tenants may share the database.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

10. Miscellaneous; Extensions

Embodiments are directed to a system with one or more devices that include a hardware processor and that are configured to perform any of the operations described herein and/or recited in any of the claims below. Further embodiments are directed to method that may be performed using at least one hardware processor. Further embodiments are directed to non-transitory computer-readable storage media.

In some embodiments, a non-transitory computer-readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media comprising instructions which, when executed by one or more hardware processors, cause a performance of operations, comprising:

receiving a prompt for performing a set of tasks;

assigning an agent group to perform a set of roles associated with a dataset in support of the set of tasks, wherein the agent group comprises a plurality of agents, and wherein at least some of the agents respectively have a role to perform from the set of roles, wherein the plurality of agents comprises a first agent and a second agent, and wherein assigning the agent group to perform the set of roles comprises:
  assigning a first role to the first agent comprising (a) collecting from the dataset, a first set of responses from a first group of customers that belong to a first customer segment, and (b) providing a first role result comprising the first set of responses, wherein the first role result defines part of the set of role results, and
  assigning a second role to the second agent comprising (c) collecting from the dataset, a second set of responses from a second group of customers that are excluded from the first customer segment, and (d) providing a second role result comprising the second set of responses, wherein the second role result defines part of the set of role results;
defining a first behavior of the first agent and a second behavior of the second agent,
  wherein the first behavior of the first agent comprises: representing a first specified point of view corresponding to the first customer segment, at least by: (a) providing a first validating data instance from the dataset in support of the first specified point of view, or (b) abstaining from representing the first specified point of view with respect to the dataset when the dataset lacks the first validating data instance;
  wherein the second behavior of the second agent comprises:
    representing a second specified point of view corresponding to the second group of customers that are excluded from the first customer segment, at least by: (c) providing a second validating data instance from the dataset in support of the second specified point of view, or (d) abstaining from representing the second specified point of view with respect to the dataset when the dataset lacks the second validating data instance;
causing the plurality of agents to respectively perform the set of roles using at least a first machine-learning model,
  wherein the first agent performs the first role, using at least the first machine-learning model, comprising: (a) collecting from the dataset, the first set of responses from the first group of customers that belong to the first customer segment, and (b) providing the first role result comprising the first set of responses,
  wherein the second agent performs the second role, using at least the first machine-learning model, comprising: (c) collecting from the dataset, the second set of responses from the second group of customers that are excluded from the first customer segment, and (d) providing the second role result comprising the second set of responses;
receiving a set of role results from the plurality of agents responsive to the plurality of agents performing the set of roles, wherein the set of role results comprises: the first role result comprising the first set of responses, and the second role result comprising the second set of responses;
performing the set of tasks using at least a second machine-learning model, wherein the second machine-learning model is one of a different model or the first machine-learning model, wherein the set of tasks comprises:
  executing, with at least the second machine-learning model, a set of operations on the set of role results, wherein executing the set of operations on the set of role results comprises:
    executing a first task comprising: determining from the first role result, a first set of topics mentioned in the first set of responses, and
    executing a second task comprising: determining from the second role result, a second set of topics mentioned in the second set of responses; and
  generating a set of task results, wherein the set of task results comprises a product of the set of operations executed on the set of role results, wherein generating the set of task results comprises:
    generating a first task result comprising the first set of topics, and
    generating a second task result comprising the second set of topics;
providing the set of task results for display on a user interface device, wherein providing the set of task results for display on the user interface device comprises:
  outputting the first task result for display on the user interface device, and
  outputting the second task result for display on the user interface device.

2. The one or more non-transitory computer-readable media of claim 1, wherein causing the plurality of agents to respectively perform the set of roles comprises at least one of:
  providing to the first agent, a first instruction for the first agent to perform the first role in accordance with a first set of one or more parameters defined for the first agent, wherein responsive to the first instruction, the first agent generates the first role result and outputs the first role result; or
  providing to the second agent, a second instruction for the second agent to perform the second role in accordance with a second set of one or more parameters defined for the second agent, wherein responsive to the second instruction, the second agent generates the second role result and outputs the second role result.

3. The one or more non-transitory computer-readable media of claim 1, wherein assigning the agent group to perform the set of roles in support of the set of tasks comprises at least one of:
  selecting the agent group from among a plurality of candidate agent groups; or
  define a new agent group, and selecting the new agent group as the agent group.

4. The one or more non-transitory computer-readable media of claim 1, wherein assigning the agent group to perform the set of roles in support of the set of tasks comprises:
  determining a divergence between the set of tasks and respective ones of a plurality of candidate agent groups, or determining an absence of at least one candidate agent group; and
  defining a new agent group, and selecting the new agent group as the agent group.

5. The one or more non-transitory computer-readable media of claim 1, wherein the operations further comprise at least one of:
adding at least the first agent to the agent group; or
removing at least a third agent from the agent group.

6. The one or more non-transitory computer-readable media of claim 1, wherein the operations further comprise:
defining one or more agent parameters for at least one of the first agent or the second agent, wherein the one or more agent parameters comprise at least one of:
a role to be performed,
a context for the role to be performed, or
at least one rule to follow.

7. The one or more non-transitory computer-readable media of claim 6, wherein the role to be performed comprises:
receiving a query, and
responsive to the query, interacting with at least a third machine-learning model to collect or generate the dataset, wherein the dataset responds to a question while satisfying a response constraint.

8. The one or more non-transitory computer-readable media of claim 6, wherein the one or more agent parameters comprises the context for the role to be performed, wherein the context for the role to be performed comprises at least one of:
populating the dataset with content that meets at least one quality parameter; or
confining the role to a query that comprises a single question, wherein a token limit for the role is selected to accommodate the single question.

9. The one or more non-transitory computer-readable media of claim 6, wherein the one or more agent parameters comprises the at least one rule to follow, wherein the at least one rule to follow comprises at least one of:
an identification of the second machine-learning model to be utilized for performing the set of tasks;
a model classifier defining a type of machine-learning model to be utilized for performing the set of tasks; or
a query classifier defining a type of query-response structure to be utilized for performing the set of tasks.

10. The one or more non-transitory computer-readable media of claim 1,
wherein executing the set of operations on the set of role results further comprises executing a third task comprising:
determining from the first task result and the second task result, a third set of topics mentioned in the first set of topics that are absent from the second set of topics, and
generating a third task result comprising the third set of topics;
wherein providing the set of task results further comprises:
outputting the third task result for display on the user interface device.

11. The one or more non-transitory computer-readable media of claim 10,
wherein executing the set of operations on the set of role results further comprises executing a fourth task comprising:
generating a complete sentence for each of the third set of topics,
determining from the first task result, at least one validating data instance for each of the third set of topics, and
generating a fourth task result comprising an organized grouping of the complete sentence and the at least one validating data instance for each of the third set of topics;
wherein providing the set of task results further comprises:
outputting the fourth task result for display on the user interface device.

12. The one or more non-transitory computer-readable media of claim 11, wherein the operations further comprise:
receiving a second prompt comprising a subsequent task, and performing the subsequent task, wherein the subsequent task comprises:
executing, with at least the second machine-learning model, at least one subsequent operation on at least one of the set of role results or the set of task results,
generating a subsequent task result, wherein the subsequent task result comprises a second product of the at least one subsequent operation; and
providing the subsequent task result for display on the user interface device.

13. The one or more non-transitory computer-readable media of claim 12, wherein the subsequent task comprises a request for follow-up information about the first customer segment.

14. The one or more non-transitory computer-readable media of claim 13, wherein the operations further comprise at least one of:
retraining the first machine-learning model based at least in part on the set of role results from the plurality of agents; or
retraining the second machine-learning model based at least in part on the set of task results.

15. A method, comprising:
receiving a prompt for performing a set of tasks;
assigning an agent group to perform a set of roles associated with a dataset in support of the set of tasks, wherein the agent group comprises a plurality of agents, and wherein at least some of the agents respectively have a role to perform from the set of roles, wherein the plurality of agents comprises a first agent and a second agent, and wherein assigning the agent group to perform the set of roles comprises:
assigning a first role to the first agent comprising (a) collecting from the dataset, a first set of responses from a first group of customers that belong to a first customer segment, and (b) providing a first role result comprising the first set of responses, wherein the first role result defines part of the set of role results, and
assigning a second role to the second agent comprising (c) collecting from the dataset, a second set of responses from a second group of customers that are excluded from the first customer segment, and (d) providing a second role result comprising the second set of responses, wherein the second role result defines part of the set of role results;
defining a first behavior of the first agent and a second behavior of the second agent,
wherein the first behavior of the first agent comprises:
representing a first specified point of view corresponding to the first customer segment, at least by:
(a) providing a first validating data instance from the dataset in support of the first specified point of view, or (b) abstaining from representing the first specified point of view with respect to the dataset when the dataset lacks the first validating data instance;
wherein the second behavior of the second agent comprises:
representing a second specified point of view corresponding to the second group of customers that are excluded from the first customer segment, at least by: (c) providing a second validating data instance from the dataset in support of the second specified point of view, or (d) abstaining from representing the second specified point of view with respect to the dataset when the dataset lacks the second validating data instance;
causing the plurality of agents to respectively perform the set of roles using at least a first machine-learning model,
wherein the first agent performs the first role, using at least the first machine-learning model, comprising: (a) collecting from the dataset, the first set of responses from the first group of customers that belong to the first customer segment, and (b) providing the first role result comprising the first set of responses,
wherein the second agent performs the second role, using at least the first machine-learning model, comprising: (c) collecting from the dataset, the second set of responses from the second group of customers that are excluded from the first customer segment, and (d) providing the second role result comprising the second set of responses;
receiving a set of role results from the plurality of agents responsive to the plurality of agents performing the set of roles, wherein the set of role results comprises: the first role result comprising the first set of responses, and the second role result comprising the second set of responses;
performing the set of tasks using at least a second machine-learning model, wherein the second machine-learning model is one of a different model or the first machine-learning model, wherein the set of tasks comprises:
executing, with at least the second machine-learning model, a set of operations on the set of role results, wherein executing the set of operations on the set of role results comprises:
executing a first task comprising: determining from the first role result, a first set of topics mentioned in the first set of responses, and
executing a second task comprising: determining from the second role result, a second set of topics mentioned in the second set of responses; and
generating a set of task results, wherein the set of task results comprises a product of the set of operations executed on the set of role results, wherein generating the set of task results comprises:
generating a first task result comprising the first set of topics, and
generating a second task result comprising the second set of topics;
providing the set of task results for display on a user interface device, wherein providing the set of task results for display on the user interface device comprises:
outputting the first task result for display on the user interface device, and
outputting the second task result for display on the user interface device;
wherein the method is performed using at least one hardware processor.

16. A system comprising:
at least one hardware processor;
the system being configured to execute operations, using the at least one hardware processor, the operations comprising:
receiving a prompt for performing a set of tasks;
assigning an agent group to perform a set of roles associated with a dataset in support of the set of tasks, wherein the agent group comprises a plurality of agents, and wherein at least some of the agents respectively have a role to perform from the set of roles, wherein the plurality of agents comprises a first agent and a second agent, and wherein assigning the agent group to perform the set of roles comprises:
assigning a first role to the first agent comprising (a) collecting from the dataset, a first set of responses from a first group of customers that belong to a first customer segment, and (b) providing a first role result comprising the first set of responses, wherein the first role result defines part of the set of role results, and
assigning a second role to the second agent comprising (c) collecting from the dataset, a second set of responses from a second group of customers that are excluded from the first customer segment, and (d) providing a second role result comprising the second set of responses, wherein the second role result defines part of the set of role results;
defining a first behavior of the first agent and a second behavior of the second agent,
wherein the first behavior of the first agent comprises:
representing a first specified point of view corresponding to the first customer segment, at least by: (a) providing a first validating data instance from the dataset in support of the first specified point of view, or (b) abstaining from representing the first specified point of view with respect to the dataset when the dataset lacks the first validating data instance;
wherein the second behavior of the second agent comprises:
representing a second specified point of view corresponding to the second group of customers that are excluded from the first customer segment, at least by: (c) providing a second validating data instance from the dataset in support of the second specified point of view, or (d) abstaining from representing the second specified point of view with respect to the dataset when the dataset lacks the second validating data instance;
causing the plurality of agents to respectively perform the set of roles using at least a first machine-learning model,
wherein the first agent performs the first role, using at least the first machine-learning model, comprising: (a) collecting from the dataset, the first set of responses from the first group of customers that belong to the first customer segment, and (b) providing the first role result comprising the first set of responses, wherein the second agent performs the second role, using at least the first machine-learning model, comprising: (c) collecting from the dataset, the second set of responses from the second group of customers that are excluded from the first customer segment, and (d) providing the second role result comprising the second set of responses;

receiving a set of role results from the plurality of agents responsive to the plurality of agents performing the set of roles, wherein the set of role results comprises: the first role result comprising the first set of responses, and the second role result comprising the second set of responses;

performing the set of tasks using at least a second machine-learning model, wherein the second machine-learning model is one of a different model or the first machine-learning model, wherein the set of tasks comprises:

executing, with at least the second machine-learning model, a set of operations on the set of role results, wherein executing the set of operations on the set of role results comprises:

executing a first task comprising: determining from the first role result, a first set of topics mentioned in the first set of responses, and executing a second task comprising: determining from the second role result, a second set of topics mentioned in the second set of responses; and generating a set of task results, wherein the set of task results comprises a product of the set of operations executed on the set of role results, wherein generating the set of task results comprises:

generating a first task result comprising the first set of topics, and generating a second task result comprising the second set of topics;

providing the set of task results task result for display on a user interface device, wherein providing the set of task results for display on the user interface device comprises:

outputting the first task result for display on the user interface device, and outputting the second task result for display on the user interface device.

17. The method of claim 15,
wherein executing the set of operations on the set of role results further comprises executing a third task comprising:
  determining from the first task result and the second task result, a third set of topics mentioned in the first set of topics that are absent from the second set of topics, and
  generating a third task result comprising the third set of topics;
wherein providing the set of task results further comprises:
  outputting the third task result for display on the user interface device.

18. The method of claim 17,
wherein executing the set of operations on the set of role results further comprises executing a fourth task comprising:
  generating a complete sentence for each of the third set of topics,
  determining from the first task result, at least one validating data instance for each of the third set of topics, and
  generating a fourth task result comprising an organized grouping of the complete sentence and the at least one validating data instance for each of the third set of topics;
wherein providing the set of task results further comprises:
  outputting the fourth task result for display on the user interface device.

19. The system of claim 16,
wherein executing the set of operations on the set of role results further comprises executing a third task comprising:
  determining from the first task result and the second task result, a third set of topics mentioned in the first set of topics that are absent from the second set of topics, and
  generating a third task result comprising the third set of topics;
wherein providing the set of task results further comprises:
  outputting the third task result for display on the user interface device.

20. The system of claim 19,
wherein executing the set of operations on the set of role results further comprises executing a fourth task comprising:
  generating a complete sentence for each of the third set of topics,
  determining from the first task result, at least one validating data instance for each of the third set of topics, and
  generating a fourth task result comprising an organized grouping of the complete sentence and the at least one validating data instance for each of the third set of topics;
wherein providing the set of task results further comprises:
  outputting the fourth task result for display on the user interface device.

\* \* \* \* \*